(12) United States Patent
Haynes et al.

(10) Patent No.: US 10,033,434 B1
(45) Date of Patent: Jul. 24, 2018

(54) LOOP POWERED PROCESS CONTROL INSTRUMENT WITH COMMUNICATION BYPASS CIRCUIT

(71) Applicant: Magnetrol International, Incorporated, Aurora, IL (US)

(72) Inventors: Kevin M. Haynes, Lombard, IL (US); Timothy S. Sussman, Bolingbrook, IL (US)

(73) Assignee: Magnetrol International, Incorporated, Aurora, IL (US)

( * ) Notice: Subject to any disclaimer, the term of this patent is extended or adjusted under 35 U.S.C. 154(b) by 0 days.

(21) Appl. No.: 15/651,275

(22) Filed: Jul. 17, 2017

Related U.S. Application Data

(60) Provisional application No. 62/449,653, filed on Jan. 24, 2017.

(51) Int. Cl.
  *G08B 21/00* (2006.01)
  *H04B 3/54* (2006.01)
  (Continued)

(52) U.S. Cl.
  CPC ............... *H04B 3/548* (2013.01); *H04B 1/40* (2013.01); *H04B 3/542* (2013.01); *H04B 3/56* (2013.01);
  (Continued)

(58) Field of Classification Search
  CPC . H04B 3/548; H04B 1/40; H04B 3/56; H04B 3/542; H04L 27/04; G01F 23/284; G05F 1/46
  See application file for complete search history.

(56) References Cited

U.S. PATENT DOCUMENTS

| 6,062,095 A | 5/2000 | Mulrooney et al. |
| 2004/0100281 A1 | 5/2004 | Nilsson |

(Continued)

OTHER PUBLICATIONS

International Search Report and Written Opinion dated Apr. 12, 2018.

*Primary Examiner* — Dac Ha
(74) *Attorney, Agent, or Firm* — Wood, Phillips, Katz, Clark & Mortimer

(57) ABSTRACT

A loop powered process instrument comprises a control system including a control circuit, a modem circuit and a loop output circuit. The control circuit measures a process variable and develops a measurement signal representing the process variable and includes a loop control circuit and a communication circuit. The modem circuit is operatively connected to the communication circuit and includes a modulation input port and a modulation output port. The loop output circuit receives a measurement signal from the loop control circuit and is connected to the modulation input port. A two-wire circuit is for connection to a remote power source using a two-wire process loop. A power supply with isolation is connected to the two-wire circuit and the loop output circuit to isolate the two-wire circuit from the control system. The power supply receives power from the two-wire process loop and supplies power to the control system and draws loop current on the two-wire process loop in accordance with the measurement signal and provides the modulation output on the loop current. A bypass circuit with isolation is connected between the two-wire circuit and the modem circuit modulation input port for providing input modulated signals to the modem circuit bypassing the power supply.

20 Claims, 4 Drawing Sheets

(51) Int. Cl.
*H04B 1/40* (2015.01)
*H04B 3/56* (2006.01)
*H04L 27/04* (2006.01)
G01F 23/284 (2006.01)
G05F 1/46 (2006.01)

(52) U.S. Cl.
CPC ............ *H04L 27/04* (2013.01); *G01F 23/284* (2013.01); *G05F 1/46* (2013.01)

(56) References Cited

U.S. PATENT DOCUMENTS

| | | | |
|---|---|---|---|
| 2004/0184517 A1* | 9/2004 | Westfield | G01D 3/08 375/219 |
| 2005/0168343 A1* | 8/2005 | Longsdorf | G01R 19/2509 340/664 |
| 2005/0201472 A1 | 9/2005 | Loechner | |
| 2010/0145478 A1 | 6/2010 | Takahashi | |
| 2010/0259101 A1 | 10/2010 | Micallef et al. | |
| 2011/0010120 A1* | 1/2011 | Wehrs | G01D 21/00 702/65 |
| 2014/0253227 A1 | 9/2014 | Yach et al. | |

* cited by examiner

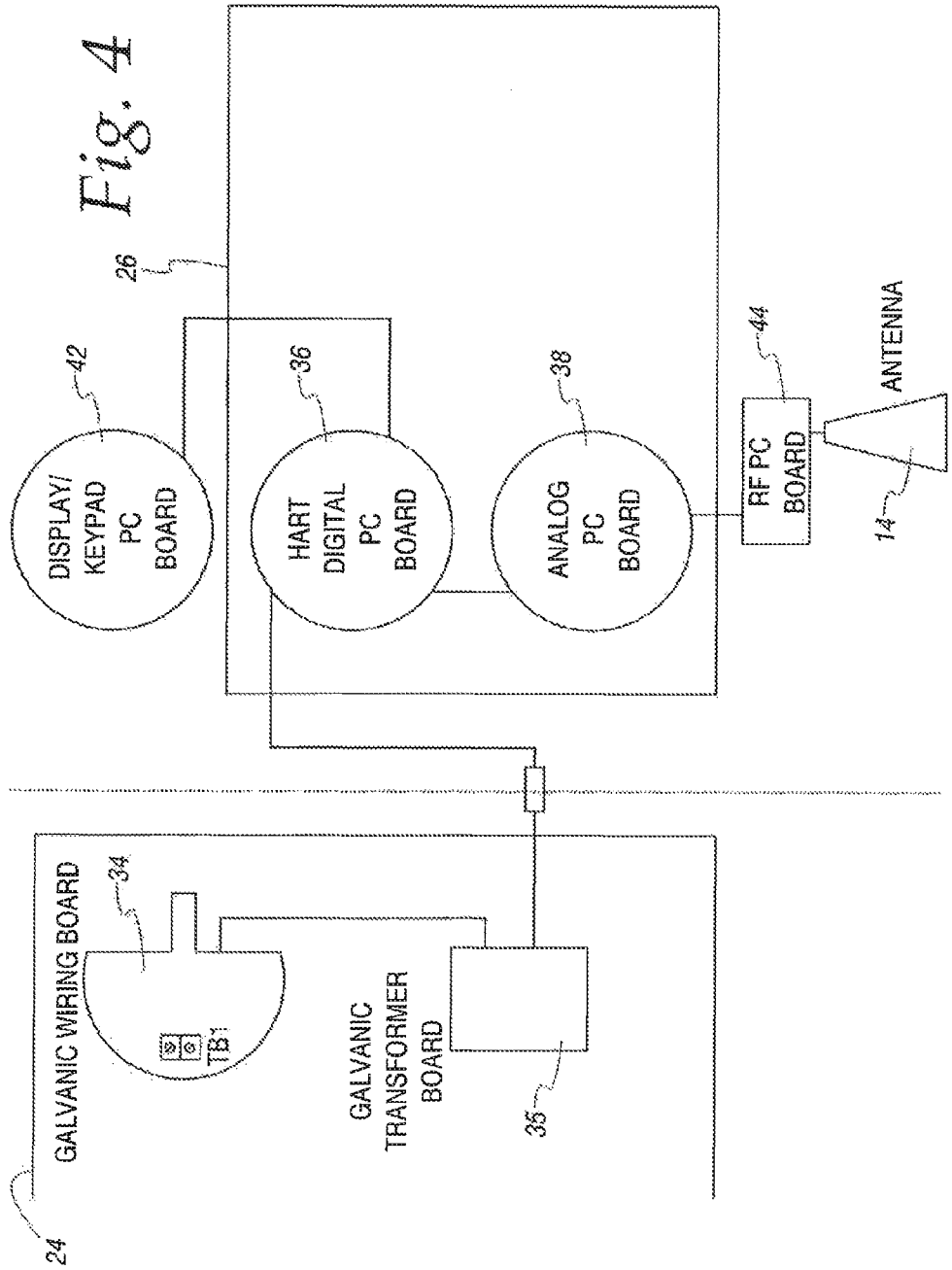

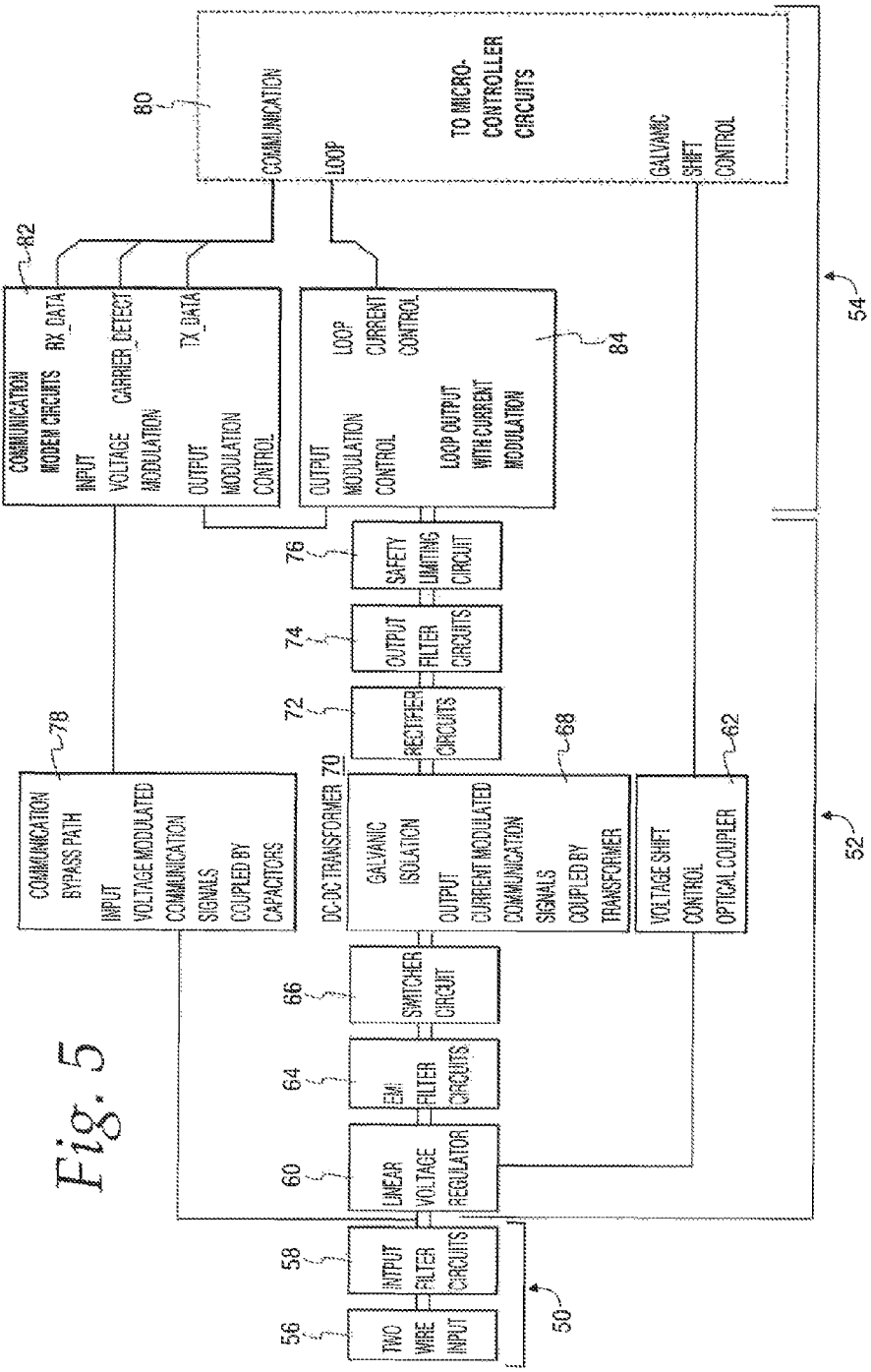

LOOP POWERED PROCESS CONTROL INSTRUMENT WITH COMMUNICATION BYPASS CIRCUIT

CROSS-REFERENCE TO RELATED APPLICATIONS

This application claims priority of provisional application No. 62/449,653, filed Jan. 24, 2017.

FEDERALLY SPONSORED RESEARCH OR DEVELOPMENT

Not Applicable.

MICROFICHE/COPYRIGHT REFERENCE

Not Applicable.

FIELD

This invention relates to process control instruments and, more particularly, to a loop powered instrument with a communication bypass circuit.

BACKGROUND

Process control systems require the accurate measurement of process variables. Typically, a sensor in the form of a primary element senses the value of a process variable and a transmitter develops an output having a value that varies as a function of the process variable. For example, a level transmitter includes a primary element for sensing level and a circuit for developing an electrical signal representing sensed level.

Knowledge of level in industrial process tanks or vessels has long been required for safe and cost-effective operation of plants. Many technologies exist for making level measurements. These include buoyancy, capacitance, ultrasonic and microwave radar, to name a few.

In one form, a through air measurement instrument, such as a microwave radar level transmitter, launches a radar signal which reflects off a liquid or other surface and the instrument measures time of flight between transmission and reception of the radar signal. Electrical energy is converted to an electromagnetic wave from a launch element. The wave propagates through free space.

A two-wire transmitter includes two terminals connected to a remote power supply. The transmitter loop current, drawn from the power supply, is proportional to the process variable. A typical instrument operates off of a 24 volt DC power supply and varies the signal current in the loop between 4 and 20 milliamps (mA) DC. Thus, the instrument must operate with current less than 4 milliamps.

While low power circuits are continuously developed, there are other increasing demands placed on performance capabilities of the process control instruments. For example, with a radar level measurement device, the instrument's performance is enhanced by more powerful digital signal processing techniques driven by a microprocessor. In addition to the microprocessor, there are several other circuits, such as the radar transceiver, which requires electric power. To be successful, the instrument must use optimum processing capability and speed. This means making maximum power from the loop available to the electronics, and using it efficiently.

More recently, the loop powered instruments have utilized digital communications. Typical digital communications rely on two-way communication signals. The communication into a typical sensor device is by voltage level modulation. The communication out of a typical sensor device is by modulation of the current draw of the unit. In normal operation, the instrument must allow for 4 mA to 20 mA loop current while still communicating digital signals via modulation of the supply voltage and loop current. In addition, it is necessary to maintain high input impedance for digital communications.

In applications where a device must satisfy explosion proof requirements, a galvanic isolation circuit may be provided. However, such an isolation circuit can cause a problem with modulation of the supply voltage. Digital communications require a high input impedance into the level measuring instrument. Unfortunately, with the galvanic isolation circuitry, the communication input voltage modulated signals are not reliable once they are received at the modem through the instrument's traditional power line connections.

The present invention is directed to solving one or more of the problems discussed above in a novel and simple manner.

SUMMARY

As described herein, a loop powered process control instrument uses a bypass circuit for a digital communication input signal which bypasses a power supply.

Broadly, there is disclosed a loop powered process control instrument comprising a control system including a control circuit, a modem circuit and a loop output circuit. The control circuit measures a process variable and develops a measurement signal representing the process variable and includes a loop control circuit and a communication circuit. The modem circuit is operatively connected to the communication circuit and includes a modulation input port and a modulation output port. The loop output circuit receives a measurement signal from the loop control circuit and is connected to the modulation input port. A two-wire circuit is for connection to a remote power source using a two-wire process loop. A power supply with isolation is connected to the two-wire circuit and the loop output circuit to isolate the two-wire circuit from the control system. The power supply receives power from the two-wire process loop and supplies power to the control system and draws loop current on the two-wire process loop in accordance with the measurement signal and provides the modulation output on the loop current. A bypass circuit with isolation is connected between the two-wire circuit and the modem circuit modulation input port for providing input modulated signals to the modem circuit bypassing the power supply.

It is a feature that the bypass circuit receives a communication input voltage modulated signal from the two-wire circuit.

It is another feature that the bypass circuit comprises a series connected high voltage isolation capacitors and maintains a high input impedance.

It is another feature that the power supply comprises a voltage regulator receiving loop power and developing a regulated output voltage. The bypass circuit is connected to the two-wire circuit before the voltage regulator.

It is a further feature that the power supply comprises a transformer.

It is another feature that the modem circuit receives the input modulated signal and generates digital signals to the control circuit.

It is yet another feature that the modem circuit receives digital signals from the control circuit and generates the output modulated signal to cause modulation on the loop current.

It is an additional feature that the control circuit comprises a microcontroller.

It is still another feature that the modem circuit comprises a modem with highway addressable remote transducer (HART) capabilities.

It is still another feature that the modem circuit comprises a Fieldbus modem.

There is disclosed in accordance with another aspect a two-wire transmitter comprising a dual compartment housing defining a wiring compartment and a control compartment. A control system in the control compartment comprises a control circuit, a modem circuit and a loop output circuit. The control circuit measures a process variable and develops a measurement signal representing the process variable and including a loop control circuit and a communication circuit. The modem circuit is operatively connected to the communication circuit and includes a modulation input port and a modulation output port. The loop output circuit receives a measurement signal from the loop control circuit and is connected to the modulation output port. A two-wire circuit and a power supply are in the wiring compartment. The two-wire circuit is for connection to a remote power source using a two-wire process loop. The power supply, with isolation, is connected to the two-wire circuit and the loop output circuit to isolate the two-wire circuit from the control system. The power supply receives power from the two-wire process loop and supplies power to the control system and draws loop current on the two-wire process loop in accordance with the measurement signal and provides a modulation output on the loop current. A bypass circuit with isolation is in the wiring compartment connected between the two-wire circuit and the modem circuit modulation input port for providing input modulated signals to the modem circuit bypassing the power supply.

It is a feature that the wiring compartment comprises an explosion proof compartment and the control compartment comprises an intrinsically safe compartment.

Other features and advantages will be apparent from a review of the entire specification, including the drawings and claims.

BRIEF DESCRIPTION OF THE DRAWINGS

FIG. 4 is a block diagram illustrating the relationship between circuit boards in the dual compartment control housing of FIG. 3; and FIG. 5 is a block diagram of the circuitry of the loop powered process control instrument.

DETAILED DESCRIPTION

Figure 1:
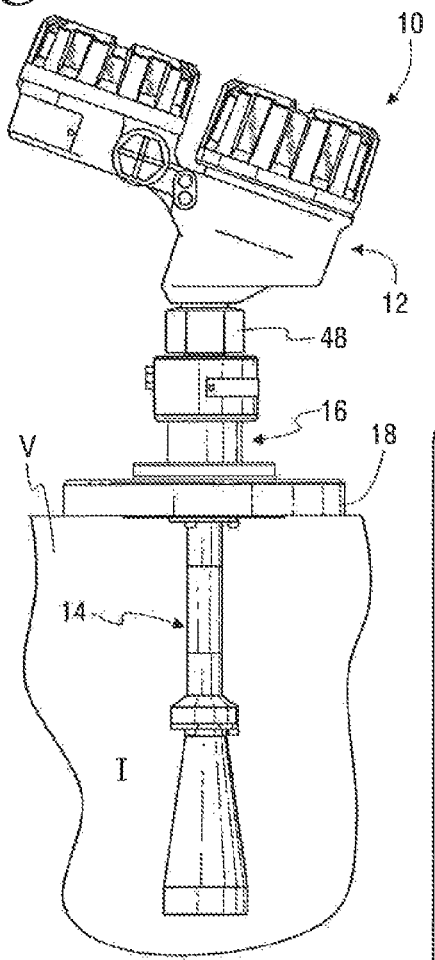
FIG. 1 is a side view of a loop powered process control instrument including a bypass circuit in accordance with the invention.
Figure 2:
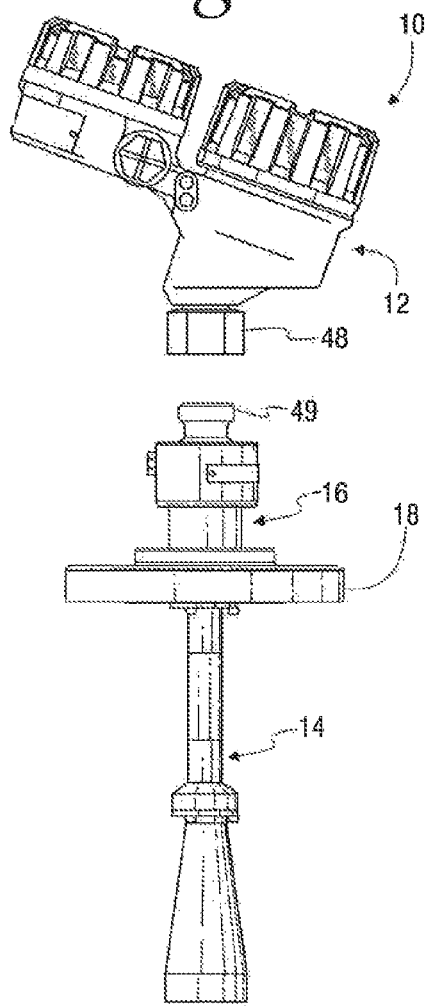
FIG. 2 is a side view, similar to FIG. 1, with a dual compartment control housing separate from a primary element.

Referring to FIGS. 1 and 2, a loop powered process control instrument 10, also referred to as a two-wire transmitter, according to the invention is illustrated. The process control instrument 10 uses micro power impulse radar (MIR) in conjunction with equivalent time sampling (ETS) and ultra-wideband (UWB) transceivers for measuring a level using time domain reflectometry (TDR). Particularly, the instrument 10 uses through air radar for sensing level. While the embodiments described herein relate to an MIR level sensing apparatus, various aspects of the invention may be used with other types of process control instruments for measuring various process parameters, as will be apparent to those skilled in the art.

The process control instrument 10 includes a control housing 12 and a sensor or primary element 14. In the illustrated embodiment, the primary element 14 is an antenna.

The antenna 14 includes a process adapter 16 for connection to the housing 12. The process adapter 16 is mounted to a process vessel V, see FIG. 1, using a flange 18. The process adapter 16 may be threaded or welded to the flange 18. Alternatively, the process adapter 16 may be threaded directly into an opening in the process vessel V.

The instrument 10 uses pulse-burst radar technology with ETS circuitry. Short bursts of microwave energy are emitted and subsequently reflected from a surface. The distance is calculated by the equation.

$$D = (\text{velocity of EM propagation}) * \text{transit time(round trip)}/2.$$

Level is then calculated by applying a tank height value. ETS is used to measure the high speed, low power electromagnetic (EM) energy. The high-speed EM energy (1,000 ft/µs) is difficult to measure over short distances and at the resolution required in the process control industry. ETS captures the EM signals in real time (nanoseconds) and reconstructs them in equivalent time (milliseconds), which is much easier to measure. ETS is accomplished by scanning the vessel to collect thousands of samples. The round-trip event on a 65 ft. tank takes only 133 nanoseconds in real time. After it is reconstructed in equivalent time it measures 200 milliseconds.

The through air radar level measurement instrument 10 launches a radar signal which reflects off a liquid or other surface and measures time of flight between transmission and reception of the radar signal. Electrical energy is converted to an electromagnetic wave from the launching element which propagates through free space. The system operates a signal around 26 GHz.

Figure 3:
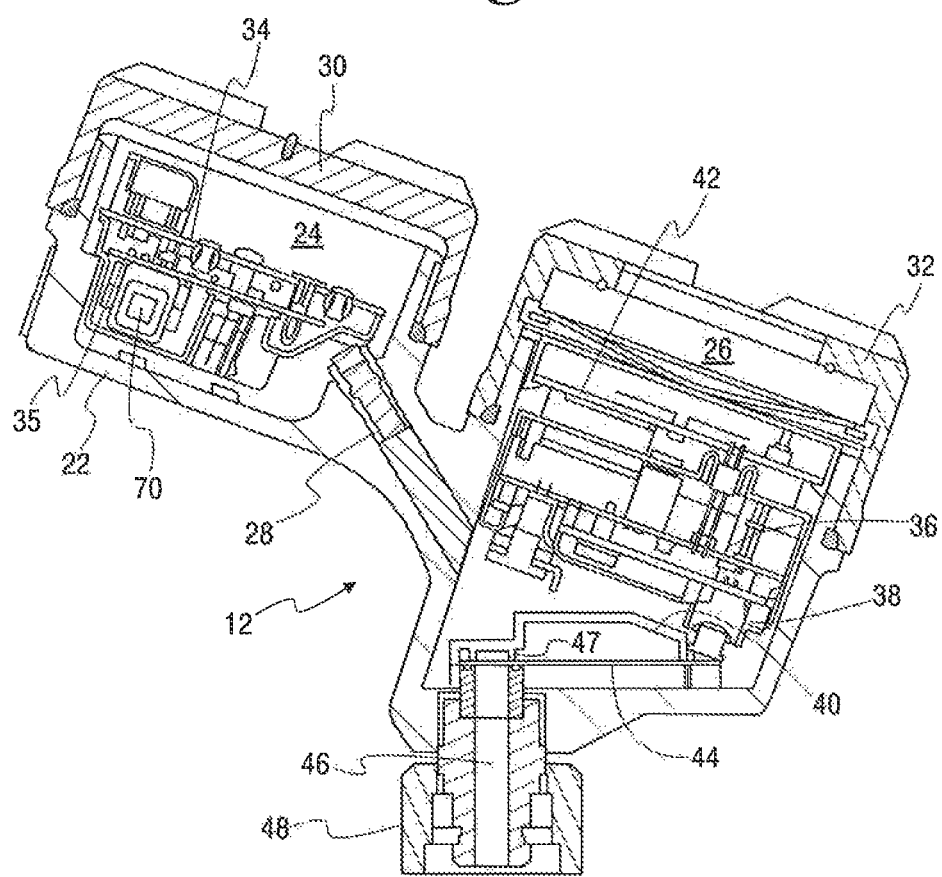
FIG. 3 is a side section view of the dual compartment control housing.

Referring to FIG. 3, the control housing 12 comprises a dual compartment housing including a base 22 defining an explosion proof wiring compartment 24 and an intrinsically safe control compartment 26 connected via a passage 28. A first cover 30 encloses the wiring compartment 24. A second cover 32 encloses the control compartment 26. The wiring compartment 24 houses a wiring board 34 and a galvanic transformer board 35 for connecting to a remote power source and including necessary interface circuitry. This circuitry is in communication with a digital PC board 36 and an analog PC board 38 in the control compartment 26. The digital PC board 36 includes a microprocessor for controlling functionality of the overall instrument. The analog PC board 38 includes signal processing circuitry which drives a radio frequency (RF) module 40 and further processes the return signal from the RF module 40. The RF module 40 is in communication with the antenna 14, as described below. A display/keypad PC board 42 is connected to the digital PC board 36 and is viewable through and accessible upon removal of the second cover 32.

The form of the housing 12 and the circuits therein are illustrated and described by way of example only. The invention is particularly directed to a communication bypass around a galvanic isolation power supply, as described below.

The RF module 40 has a printed circuit board 44 with a conventional launching element. In the illustrated embodiment, the launching element comprises electro-magnetic radiating elements which are conductive traces designed on the circuit board 44. The launching element generates and receives a high frequency signal for measuring level.

An air-filled antenna waveguide 46 is sealingly mounted to the control housing 12 and aligned with the launching element on the printed circuit board 44. Thus, the launching element works together with the waveguide 46 and a waveguide cap 47 to generate the launching signal to the antenna 14, as is known. The air-filled waveguide 46 is adapted to operate in the K band.

The antenna waveguide 46 is surrounded by a quick connect coupler 48 for mating with a corresponding quick connect coupler 49 on the antenna 14, see FIG. 2. This provides a quick connect/disconnect coupling that allows the vessel V to remain sealed upon removal of the control housing 12.

While this application describes the bypass circuit and galvanic isolation in connection with a through air radar level transmitter, this circuitry can be used with process control instruments for measuring other parameters and using other technologies including, for example, guided wave radar, capacitance, or the like.

Referring also to FIG. 4, the display/keypad PC board 42 provides a user interface for entering parameters with a keypad and displaying user and status information. The digital PC board 36 includes a conventional microcontroller and memory. The memory may comprise both non-volatile memory for storing programs and calibration parameters, as well as volatile memory used during level measurements. The digital PC board is also connected through the galvanic transformer board 35 to the wiring board 34 for connecting to a remote and external power source over a two-wire loop. The two-wire connection is used to communicate level information, as is well known.

As described more particularly below, the circuits in the wiring compartment 24 accept supply voltage at input terminals TB1 from the customer and provide power to the balance of the unit 10 through a galvanically isolated barrier. The galvanic isolation is important because it allows the unit to operate as explosion-proof in the wiring compartment 24 and intrinsically safe (IS) in the control compartment 26, while not requiring a special IS ground wire. Digital communication signals, such as, for example, HART, Fieldbus or Profibus, or other, must pass cleanly through the circuits.

Referring to FIG. 5, a block diagram illustrates the circuitry in the wiring compartment 24 which includes a two-wire circuit 50 and a power supply 52. The two-wire circuit 50 is for connection to a remote power source using a two-wire process loop, as is known, for controlling current on the loop in accordance with a measurement signal from a control system 54 comprising the circuitry in the intrinsically safe control compartment 26. As will be apparent, only a portion of the circuitry of the control system 54 is illustrated herein. The power supply 52 has a galvanic isolation barrier and is connected between the two-wire circuit 50 and the control system 54 to isolate the two-wire circuit 50 from the control system 54. The power supply 52 receives power from the two-wire process loop and supplies power to the control system 54.

The two-wire circuit 50 comprises a two-wire input block 56 and an input filter circuits block 58. The two-wire input block 56 provides the customer input to the unit at the terminal block TB1, see FIG. 4. This is the user connection to the instrument 10. The user must provide suitable power and the unit will draw loop current based on the level in the process as measured by the control system 54. Typical of most two-wire instruments, this unit will draw 4 mA to 20 mA based on the measured level in the process. The digital communication into the two-wire input block 56 may be by voltage level modulation. The digital communication out is by modulation of the current draw of the unit.

The input filter circuits block 58 includes standard filter circuits that suppress noise from entering deeper into the unit 10 where it could cause damage to the unit 10 or corrupt normal operation.

The power supply 52 is on the galvanic transformer board 35, see FIG. 4. The power supply 52 comprises a linear voltage regulator 60. In the illustrated embodiment, the voltage is set by voltage reference zener diodes and can be shifted by the control system 54 using a voltage shift control 62 using an optical coupler. The voltage regulator 60 makes the input impedance appear high to the digital communication signals. The voltage of the voltage regulator 60 must be lower than the terminal voltage to the transformer board 35. However, the voltage must be high enough to supply sufficient power for the unit 10 to operate properly. The voltage regulator 60 also helps to eliminate noise at the terminals TB1 caused by the circuits deeper in the unit 10. The voltage shift of the regulator voltage is important to maintain high input impedance over the range of loop current that must pass the circuit.

The voltage regulator 60 supplies regulated voltage to EMI filter circuits 64 which filter against electromagnetic interference. A switcher circuit block 66 is connected between the EMI filter circuit 64 and a galvanic isolation block 68 which includes a DC-DC transformer 70. The switcher circuit 66 is the switching oscillator of a DC-DC converter circuit. The oscillator drives the primary of the DC-DC transformer 70. The oscillator is free running so that whenever power is supplied to the board, the switcher is oscillating. The frequency of this switching oscillator must be sufficiently high, such as about 150 kHz, to allow the lower frequency communication signals to be passed cleanly through the circuit. Also, the goal of the overall circuit is to have the secondary current of the transformer 70 to be closely matched by the primary current. The close match of the current allows the loop control to be performed at the secondary of the transformer 70 and yet be tightly coupled to the primary and thus to the user terminals TB1. The current transfer is the critical parameter that must be maintained by these circuits. The current loop control, 4 mA to 20 mA, takes place in the secondary circuits via the control system 54.

The galvanic isolation block 68 uses the DC-DC transformer 70 as the primary component. To assure proper isolation, this transformer 70 must meet several specific IS safety requirements. The transformer must meet high isolation voltage requirements and assure proper creepage and clearance spacing requirements. The galvanic isolation circuit 68 must be capable of passing the current modulated signal, without distortion, to the user terminals TB1.

The secondary of the galvanic isolation block 68 is connected to a rectifier circuit 72 to provide a DC voltage. The result is a DC supply voltage which is loosely controlled by the voltage regulator 60 but tightly passes the loop current. An output filter circuit block 74 receives the rectified DC voltage and includes a low pass filter to suppress the switcher edges. The resulting DC voltage must not have switching frequency noise which could disrupt operation of the unit 10. A safety limiting circuit 76 limits the level of the supply DC voltage to the control system 54.

The power supply 52 also includes a communication bypass path block 78 which allows digital communication signals, such as HART, Fieldbus, Profibus, or the like, to bypass the galvanic isolation circuit 68.

The control system 54 comprises circuits in the intrinsically safe control compartment 26 that includes a block 80, referred to below as a microcontroller block, that provides connections to microcontroller circuits, a communication modem circuits block 82 and a loop output block 84. The microcontroller block 80 includes conventional circuitry for low voltage power supply loop control circuits, communication circuits, programmed logic circuits, user interface and measurement circuits. These circuits measure the process variable and develop a measurement signal representing the process variable. This measurement signal is output from a loop control circuit and is labeled LOOP which determines level of loop current to be drawn by the unit 10. There is also communication circuit labeled COMMUNICATION for controlling digital communications over the two-wire process loop.

The modem circuits block 82 controls the digital communications. In the illustrated embodiment, this may comprise a DS8500 modem circuit used for conventional Highway Addressable Remote Transducer (HART) communications. However, the invention is not limited to use with HART communications and may be used with other forms of digital communications including, for example, Fieldbus, Profibus, or the like.

HART communication, as is typical of other digital communication systems, relies on the two-way communication signals. The communication into a typical sensor device is by voltage level modulation. The communication out of a typical sensor device is by modulation of the current draw of the unit.

From a HART physical layer perspective when using HART communications, the power supply galvanic isolation causes a problem with the HART communication input signal which is a voltage modulation signal that is sent to the modem circuits block 82 on the digital board 36 through the two-wire 4/20 mA power lines. HART communication requires a high input impedance into the level measuring instrument. With the galvanic isolated circuitry, the communication input voltage modulated signals are not reliable once they are received at the HART modem through the instrument's traditional power line connections.

As described herein, a bypass circuit path is provided for the communication input voltage modulated signal to the modem circuits block 82. This is shown as the communication bypass path block 78 in FIG. 5. This circuit path, or bypass, makes a connection in front of the voltage regulator 60 on the wiring board 34. This connection is then isolated from the power supply 52 using two series connected high voltage isolation capacitors (not shown) and maintains a high impedance to the power lines which is needed for the HART physical layer specification. After the capacitors, the separate circuit path connects to the INPUT VOLTAGE MODULATION input of the communication modem circuits block 82. The HART voltage modulated input signals are de-modulated and generate the digital signals RX-DATA and CARRIER_DETECT which are passed to the microcontroller block 80 for processing, as is known.

The microcontroller block 80 controls the loop current DC level, 4 mA to 20 mA, as an indication of the process level that the instrument monitors, and responds to the received communication signals and in turn controls the digital transmit signal, TX_DATA, and the LOOP signal from the loop control circuit. The modem block 82 modulates the TX_DATA signal to generate the OUTPUT MODULATION CONTROL output to the loop output block 84 which causes the modulation on the loop output. The loop output block 84 also receives the LOOP output from the microcontroller block 80 and uses this to control the loop current drawn from the safety limiting circuit 76 while including current modulation responsive to the OUTPUT MODULATION CONTROL from the modem block 82. Thus, the returning current modulated signal from the modem block 82 moves through the galvanic transformer 70 on the wiring board 34, then through the voltage regulator 60, and finally out of the device on the two-wire 4/20 mA power lines.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The foregoing disclosure of specific embodiments is intended to be illustrative of the broad concepts comprehended by the invention.

The invention claimed is:

1. A loop powered process control instrument comprising:
a control system comprising a control circuit, a modem circuit and a loop output circuit, the control circuit measuring a process variable and developing a measurement signal representing the process variable and including a loop control circuit and a communication circuit, the modem circuit operatively connected to the communication circuit and including a modulation input port and a modulation output port, the loop output circuit receiving the measurement signal from the loop control circuit and being connected to the modulation output port;
a two-wire circuit for connection to a remote power source using a two-wire process loop;
a power supply with isolation, connected to the two-wire circuit and the loop output circuit, to isolate the two-wire circuit from the control system, the power supply receiving power from the two-wire process loop and supplying power to the control system and drawing loop current on the two-wire process loop in accordance with the measurement signal and providing the modulation output on the loop current; and
a bypass circuit with isolation connected between the two-wire circuit and the modem circuit modulation input port for providing input modulated signals to the modem circuit bypassing the power supply.

2. The loop powered process instrument of claim 1 wherein the bypass circuit receives a communication input voltage modulated signal from the two-wire circuit.

3. The loop powered process instrument of claim 1 wherein the bypass circuit comprises series connected high voltage isolation capacitors and maintains a high input impedance.

4. The loop powered process instrument of claim 1 wherein the power supply comprises a voltage regulator receiving loop power and developing a regulated output voltage and the bypass circuit connects to the two-wire circuit before the voltage regulator.

5. The loop powered process instrument of claim 1 wherein the power supply comprises a transformer.

6. The loop powered process instrument of claim 1 wherein the modem circuit receives the input modulated signal and generates digital signals to the control circuit.

7. The loop powered process instrument of claim 1 wherein the modem circuit receives digital signals from the control circuit and generates the output modulated signal to cause modulation on the loop current.

8. The loop powered process instrument of claim 1 wherein the control circuit comprises a microcontroller.

9. The loop powered process instrument of claim 1 wherein the modem circuit comprises a modem with Highway Addressable Remote Transducer (HART) capabilities.

10. The loop powered process instrument of claim 1 wherein the modem circuit comprises a Fieldbus modem.

11. A two-wire transmitter comprising:
a dual compartment housing defining a wiring compartment and a control compartment;
a control system in the control compartment comprising a control circuit, a modem circuit and a loop output circuit, the control circuit measuring a process variable and developing a measurement signal representing the process variable and including a loop control circuit and a communication circuit, the modem circuit operatively connected to the communication circuit and including a modulation input port and a modulation output port, the loop output circuit receiving the measurement signal from the loop control circuit and being connected to the modulation output port;
a two-wire circuit and a power supply in the wiring compartment, the two-wire circuit for connection to a remote power source using a two-wire process loop and the power supply, with isolation, connected to the two-wire circuit and the loop output circuit, to isolate the two-wire circuit from the control system, the power supply receiving power from the two-wire process loop and supplying power to the control system and drawing loop current on the two-wire process loop in accordance with the measurement signal and providing a modulation output on the loop current; and
a bypass circuit with isolation in the wiring compartment connected between the two-wire circuit and the modem circuit modulation input port for providing input modulated signals to the modem circuit bypassing the power supply.

12. The two-wire transmitter of claim 11 wherein the bypass circuit receives a communication input voltage modulated signal from the two-wire circuit.

13. The two-wire transmitter of claim 11 wherein the bypass circuit comprises series connected high voltage isolation capacitors and maintains a high input impedance.

14. The two-wire transmitter of claim 11 wherein the power supply comprises a voltage regulator receiving loop power and developing a regulated output voltage and the bypass circuit connects to the two-wire circuit before the voltage regulator.

15. The two-wire transmitter of claim 11 wherein the modem circuit receives the input modulated signal and generates digital signals to the control circuit.

16. The two-wire transmitter of claim 11 wherein the modem circuit receives digital signals from the control circuit and generates the output modulated signal to cause modulation on the loop current.

17. The two-wire transmitter of claim 16 wherein the modem circuit comprises a modem with Highway Addressable Remote Transducer (HART) capabilities.

18. The two-wire transmitter of claim 16 wherein the modem circuit comprises a Fieldbus modem.

19. The two-wire transmitter of claim 11 wherein the control circuit comprises a microcontroller.

20. The two-wire transmitter of claim 11 wherein the wiring compartment comprises an explosion proof compartment and the control compartment comprises an intrinsically safe compartment.

* * * * *